(12) United States Patent
Hu et al.

(10) Patent No.: US 11,256,368 B2
(45) Date of Patent: Feb. 22, 2022

(54) TOUCH COMPENSATION APPARATUS, TOUCH COMPENSATION METHOD, AND TOUCH SCREEN

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Yufei Hu, Beijing (CN); Yifei Zhan, Beijing (CN); Youshan Hou, Beijing (CN); Feng Yang, Beijing (CN); Cheng Chen, Beijing (CN)

(73) Assignees: HEFEI BOE OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/966,088

(22) PCT Filed: Nov. 26, 2019

(86) PCT No.: PCT/CN2019/120800
§ 371 (c)(1),
(2) Date: Jul. 30, 2020

(87) PCT Pub. No.: WO2021/102662
PCT Pub. Date: Jun. 3, 2021

(65) Prior Publication Data
US 2021/0326025 A1    Oct. 21, 2021

(51) Int. Cl.
*G06F 3/041* (2006.01)

(52) U.S. Cl.
CPC ............................. *G06F 3/04186* (2019.05)

(58) Field of Classification Search
CPC ................................................ G06F 3/04186
See application file for complete search history.

(56) References Cited

U.S. PATENT DOCUMENTS 10,593,260 B1 *   3/2020   Cai .................... H01L 27/3265
2010/0071965 A1 *  3/2010   Hu ........................ G06F 3/0446
                                                                178/18.06
(Continued)

FOREIGN PATENT DOCUMENTS

CN    104346091 A    2/2015
CN    105573538 A    5/2016
(Continued)

*Primary Examiner* — Ibrahim A Khan
(74) *Attorney, Agent, or Firm* — McDermott Will and Emery LLP

(57) ABSTRACT

A touch compensation method includes: for at least one line, estimating coordinates of a point to be compensated at a current moment according to coordinates of n touch recognition points at n previous moments, and n being an integer greater than or equal to 2; calculating compensation data of a touch model corresponding to the point to be compensated according to first touch data of a touch model corresponding to a touch recognition point of a previous 1st moment $T_1$; obtaining all touch data of a touch screen at the current moment, and obtaining second touch data at the current moment at a place where the touch model corresponding to the point to be compensated is located from the all touch data according to the coordinates of the point to be compensated; and compensating the second touch data according to the compensation data.

19 Claims, 17 Drawing Sheets

(56) References Cited

U.S. PATENT DOCUMENTS

| | | | | |
|---|---|---|---|---|
| 2010/0073318 A1* | 3/2010 | Hu | ............................ | G06F 3/044 |
| | | | | 345/174 |
| 2013/0181908 A1* | 7/2013 | Santiago | ............... | G06F 3/0416 |
| | | | | 345/173 |
| 2014/0176516 A1* | 6/2014 | Kim | ..................... | G09G 3/3233 |
| | | | | 345/204 |
| 2014/0313146 A1* | 10/2014 | Munechika | .......... | G06F 3/04166 |
| | | | | 345/173 |
| 2015/0091859 A1* | 4/2015 | Rosenberg | ............... | G01L 1/146 |
| | | | | 345/174 |
| 2015/0154908 A1* | 6/2015 | Nam | ..................... | G09G 3/3233 |
| | | | | 345/76 |
| 2015/0169123 A1* | 6/2015 | Lee | ....................... | G06F 3/0446 |
| | | | | 345/174 |
| 2015/0227258 A1* | 8/2015 | Wang | ................... | G06F 3/04186 |
| | | | | 345/174 |
| 2015/0355740 A1* | 12/2015 | Yumoto | .............. | G06F 3/04166 |
| | | | | 345/173 |
| 2016/0259479 A1* | 9/2016 | Kang | .................... | G06F 3/0418 |
| 2016/0357339 A1* | 12/2016 | Ritchey | .................. | G06F 3/0446 |
| 2016/0370894 A1* | 12/2016 | Povalac | .............. | G06F 3/03545 |
| 2017/0061865 A1* | 3/2017 | Park | ....................... | G09G 3/325 |
| 2017/0083156 A1* | 3/2017 | Lee | ...................... | G06F 3/04883 |
| 2017/0115808 A1* | 4/2017 | Cho | .................... | G06F 3/04166 |
| 2017/0169757 A1* | 6/2017 | Kim | ..................... | G09G 3/2092 |
| 2017/0169763 A1* | 6/2017 | Bi | ............................ | G09G 5/003 |
| 2017/0206840 A1* | 7/2017 | Cho | .................... | G09G 3/3266 |
| 2018/0337682 A1* | 11/2018 | Takasugi | .............. | G09G 3/3266 |

FOREIGN PATENT DOCUMENTS

| | | |
|---|---|---|
| CN | 105975122 A | 9/2016 |
| CN | 105975127 A | 9/2016 |

* cited by examiner

| 6 | 42 | 28 |
|---|---|---|
| 6 | 275 | 121 |
| 6 | 123 | 61 |
| 2 | 35 | 16 |
| 4 | 216 | 96 |
| 4 | 140 | 63 |
| 8 | 278 | 98 |
| 1 | 45 | 18 |

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 2 | 6 | 118 | 70 | 0 | 0 |
| 0 | 0 | 0 | 0 | 0 | 6 | 1002 | 431 | 0 | 0 |
| 0 | 0 | 0 | 0 | 0 | 6 | 526 | 274 | 0 | 0 |
| 0 | 0 | 0 | 0 | 4 | 2 | 163 | 23 | 0 | 0 |
| 0 | 0 | 0 | 0 | 4 | 18 | 914 | 142 | 0 | 0 |
| 0 | 0 | 0 | 0 | 6 | 33 | 875 | 205 | 0 | 0 |
| 0 | 0 | 0 | 0 | 6 | 66 | 969 | 316 | 0 | 0 |
| 0 | 0 | 0 | 0 | 0 | 4 | 125 | 29 | 0 | 0 |
| 0 | 0 | 0 | 0 | 0 | 0 | 0 | 0 | 0 | 0 |

FIG. 17

|   |   |   |   |   |   |   |   |   |   |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 2 | 6 | 118 | 70 | 0 | 0 |
| 0 | 0 | 0 | 0 | 0 | 6 | 1002 | 431 | 0 | 0 |
| 0 | 0 | 0 | 0 | 0 | 6 | 526 | 274 | 0 | 0 |
| 0 | 0 | 0 | 0 | 4 | 2 | 163 | 23 | 0 | 0 |
| 0 | 0 | 0 | 0 | 4 | 18 | 914 | 142 | 0 | 0 |
| 0 | 0 | 0 | 0 | 6 | 33 | 875 | 205 | 0 | 0 |
| 0 | 0 | 0 | 0 | 6 | 66 | 969 | 316 | 0 | 0 |
| 0 | 0 | 0 | 0 | 0 | 4 | 125 | 29 | 0 | 0 |
| 0 | 0 | 0 | 0 | 0 | 0 | 0 | 0 | 0 | 0 |

FIG. 18

TOUCH COMPENSATION APPARATUS, TOUCH COMPENSATION METHOD, AND TOUCH SCREEN

CROSS-REFERENCE TO RELATED APPLICATIONS

This application is a national phase entry under 35 USC 371 of International Patent Application No. PCT/CN2019/120800 filed on Nov. 26, 2019, which is incorporated herein by reference in its entirety.

TECHNICAL FIELD

The present disclosure relates to the field of touch technology, and in particular, to a touch compensation apparatus, a touch compensation method, and a touch screen.

BACKGROUND

Touch screens are widely used in human-computer interaction devices, and users can control the devices by touching the touch screen with their fingers or touch tools. There are many types of touch screens. With a capacitive touch screen as an example, when a finger or a touch tool is used to touch it, the finger will change a capacitance at a contact point. By monitoring a change in the capacitance at each touch point of the touch screen, it is possible to locate the contact point.

SUMMARY

In an aspect, a touch compensation method is provided. The touch compensation method includes: for at least one line, estimating coordinates of a point to be compensated at a current moment according to coordinates of n touch recognition points at n previous moments, the n previous moments before the current moment being T1 to Tn, and n being an integer greater than or equal to 2; calculating compensation data of a touch model corresponding to the point to be compensated according to first touch data of a touch model corresponding to a touch recognition point of a previous 1st moment $T_1$; obtaining all touch data of a touch screen at the current moment, and obtaining second touch data at the current moment at a place where the touch model corresponding to the point to be compensated is located from the all touch data according to the coordinates of the point to be compensated; and compensating the second touch data according to the compensation data.

In some embodiments, before compensating the second touch data according to the compensation data, the touch compensation method further includes: performing removal interference on the second touch data.

In some embodiments, performing the interference removal on the second touch data includes: multiplying the second touch data by an interference removal coefficient, the interference removal coefficient being greater than 0 and less than 1.

In some embodiments, the interference removal coefficient is in a range of 0.5 to 1.

In some embodiments, the interference removal coefficient is 0.8.

In some embodiments, estimating the coordinates of the point to be compensated at the current moment according to the coordinates of the n touch recognition points at the n previous moments includes: calculating the coordinates ($X_C$, $Y_C$) of the point to be compensated according to the following formulas (1) and (2):

$$X_C = X_1 + \sum_{k=1}^{n-1} A_k \cdot (X_k - X_{k+1}); \qquad (1)$$

$$Y_C = Y_1 + \sum_{k=1}^{n-1} A_k \cdot (Y_k - Y_{k+1}), \qquad (2)$$

wherein, $A_k$ represents a weight coefficient corresponding to differences between coordinates of a touch recognition point at a previous kth moment and a touch recognition point at a previous (k+1)th moment before the current moment, which are among the n touch recognition points;

$$\sum_{k=1}^{n-1} A_k = 1,$$

and $A_1 > A_2 > \ldots > A_{n-1}$; $X_k$ represents an abscissa of the touch recognition point at the previous kth moment before the current moment, and $Y_k$ represents an ordinate of the touch recognition point at the previous kth moment before the current moment.

In some embodiments, A1 is greater than 0.5.

In some embodiments, n is equal to 4, $A_1$ is equal to 0.6, $A_2$ is equal to 0.3, and $A_3$ is equal to 0.1.

In some embodiments, in a case where there are at least two lines, and there is an overlapping region between the second touch data of the touch models corresponding to the points to be compensated of two adjacent lines, compensating the second touch data according to the compensation data includes: compensating a part of the second touch data that is located in the overlapping region according to the compensation data of any one of the points to be compensated of the two adjacent lines.

In some embodiments, the compensation data includes: central compensation data calculated based on touch data of a central point in the first touch data, and peripheral compensation data calculated based on touch data of peripheral points in the first touch data. Calculating the compensation data of the touch model corresponding to the point to be compensated according to the first touch data of the touch model corresponding to the touch recognition point of the previous 1st moment $T_1$ includes: multiplying the touch data of the central point in the first touch data by a central compensation coefficient, a product obtained is used as the central compensation data; and multiplying the touch data of the peripheral points in the first touch data by a peripheral compensation coefficient, a product obtained is used as the peripheral compensation data. The central compensation coefficient is greater than or equal to the peripheral compensation coefficient In some embodiments, the central compensation coefficient is in a range of 0.2 to 0.8, and the peripheral compensation coefficient is in a range of 0.1 to 0.7.

In some embodiments, the central compensation coefficient is 0.32, and the peripheral compensation coefficient is 0.24.

In some embodiments, the second touch data includes: touch data of a central point and touch data of peripheral points. Compensating the second touch data according to the compensation data includes: adding the central compensation data to the touch data of the central point in the second touch data correspondingly; and adding the peripheral compensation data to the touch data of the peripheral points in the second touch data correspondingly.

In some embodiments, after the second touch data is compensated according to the compensation data, and compensated touch data at the current moment is obtained, the touch compensation method further includes: replacing second touch data that is uncompensated with compensated second touch data to obtain all compensated touch data at the current moment; identifying a touch model of the current moment according to all compensated touch data at the current moment; and determining a touch recognition point of the current moment according to the identified touch model of the current moment.

In some embodiments, identifying the touch model of the current moment according to the all compensated touch data at the current moment, includes: among the all compensated touch data at the current moment, if touch data of a touch point is greater than touch data of other touch points around the touch point, then identifying the touch point and the other touch points around the touch point as a touch model; and determining the touch recognition point of the current moment according to the identified touch model of the current moment, includes: determining a central point of the touch model to be the touch recognition point of the current moment.

In some embodiments, the touch model is a nine-box matrix composed of 9 touch points.

In another aspect, a touch compensation apparatus is provided. The touch compensation apparatus includes: a processor and a memory. The memory stores program instructions that are executable. When the program instructions are executed by the processor, the touch compensation apparatus is caused to perform the following steps: for at least one line, estimating coordinates of a point to be compensated at a current moment according to coordinates of n touch recognition points at n previous moments, the n previous moments before the current moment being $T_1$ to $T_n$, and n being an integer greater than or equal to 2; calculating compensation data of a touch model corresponding to the point to be compensated according to first touch data of a touch model corresponding to a touch recognition point of a previous 1st moment $T_1$; obtaining all touch data of a touch screen at the current moment, and obtaining second touch data at the current moment at a place where the touch model corresponding to the point to be compensated is located from the all touch data according to the coordinates of the point to be compensated; and compensating the second touch data according to the compensation data.

In yet another aspect, a touch screen is provided. The touch screen includes the touch compensation apparatus according to the above embodiment.

In yet another aspect, a non-transitory computer readable storage medium is provided. The non-transitory computer readable storage medium stores one or more program instructions, so as to perform one or more steps of the touch compensation method according to any one of the above embodiments.

In yet another aspect, a computer program product is provided. The computer program product includes computer program instructions. When the computer program instructions are executed by a computer, the computer program instructions cause the computer to perform one or more steps of the touch compensation method according to any of the above embodiments.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings.

In addition, the accompanying drawings to be described below may be regarded as schematic diagrams, and are not limitations on actual dimensions of products, actual processes of methods and actual timings of signals that the embodiments of the present disclosure relate to.

FIG. 10 is a schematic diagram showing another touch compensation method in a case where there is an overlapping region between second touch data of points to be compensated of different lines, according to some embodiments of the present disclosure;

FIGS. 11-18 are schematic diagrams showing how to perform touch compensation in a touch compensation method, according to some embodiments of the present disclosure;

DETAILED DESCRIPTION

The technical solutions in some embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" in the description and the claims are construed as an open and inclusive meaning, that is, "inclusive, but not limited to". In the description, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials or characteristics may be included in any one or more embodiments or examples in any suitable manner.

Below, terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of the embodiments of the present disclosure, the term "a/the plurality of" means two or more unless otherwise specified.

In an example where a finger is used to touch a capacitive touch screen, a high frequency electrical signal will be formed on touch electrodes of the capacitive touch screen, so that capacitors are formed between the touch electrodes. When the finger touches some part on the touch screen, the finger will cause a change in an amount of charge of this part, which in turn causes a change in capacitance between touch electrodes at the contact part. Therefore, a touch current signal will be generated at the contact part, and the touch screen can locate the position where the amount of charge has changed according to the received touch current signal. A magnitude of the generated touch current signal is related to a degree of change in the capacitance. The magnitude of the generated touch current signal can be converted into a numerical value, i.e., touch data, by an Analog-to-Digital Converter (abbreviated as ADC).

Figure 1:
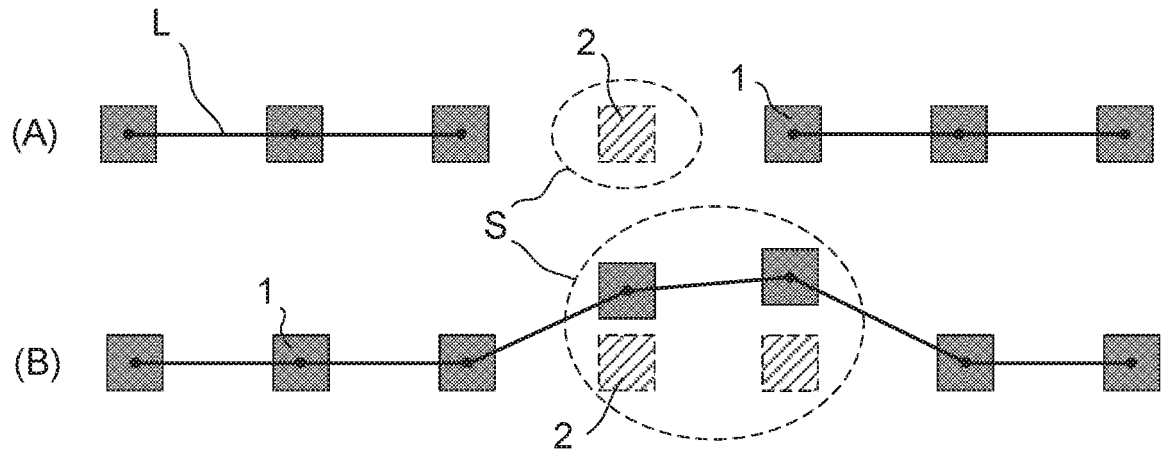
FIG. 1 is a schematic diagram showing abnormal lines drawn on a touch screen, according to the related art.

Referring to FIG. 1, in a process of using the touch screen, when a user draws a line on the touch screen, an abnormal line may be drawn. For example, a touch signal of the touch screen may be interfered by other signals inside the touch screen (for example, a liquid crystal driving signal of a liquid crystal display touch screen) and external signals, resulting in inaccurate touch recognition of the touch screen. In an example, referring to part (A) of FIG. 1, the region S is a region where an abnormal line is drawn. The touch screen fails to determine an actual contact point 2 as a touch recognition point 1, resulting in a line L appearing disconnected on the touch screen. In another example, referring to part (B) of FIG. 1, the touch recognition points 1 determined by the touch screen in the region S are inconsistent with the actual contact points 2, resulting in an abnormal jitter on the line L on the touch screen. That is, individual touch recognition points on the line deviate from an actual trajectory of the line. Especially in a case where the user requires a high touch recognition accuracy of the touch screen, for example, where the user uses the touch screen for manual drawing or writing, the touch recognition accuracy of the touch screen needs to be improved to reduce an occurrence of abnormal line drawing.

Figure 2:
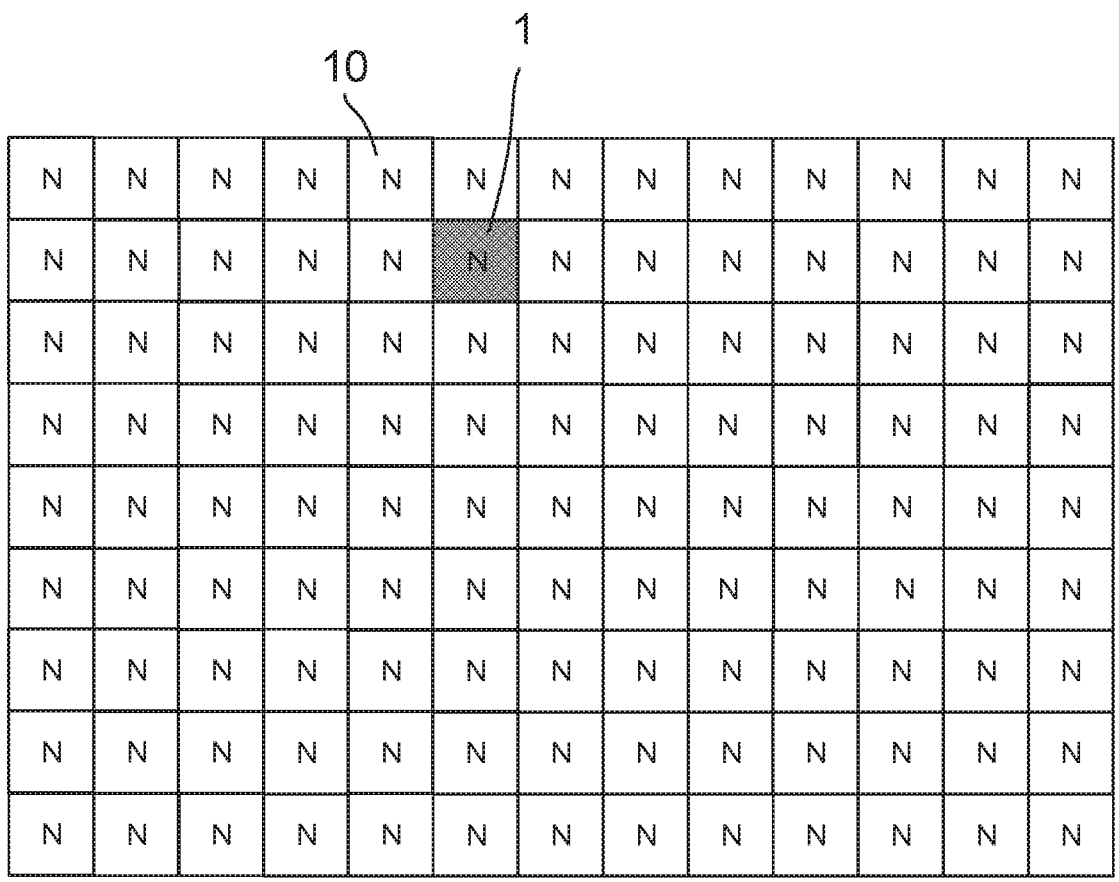
FIG. 2 is a schematic diagram showing touch points of a touch screen and touch data of the touch points, according to the related art.
Figure 3:
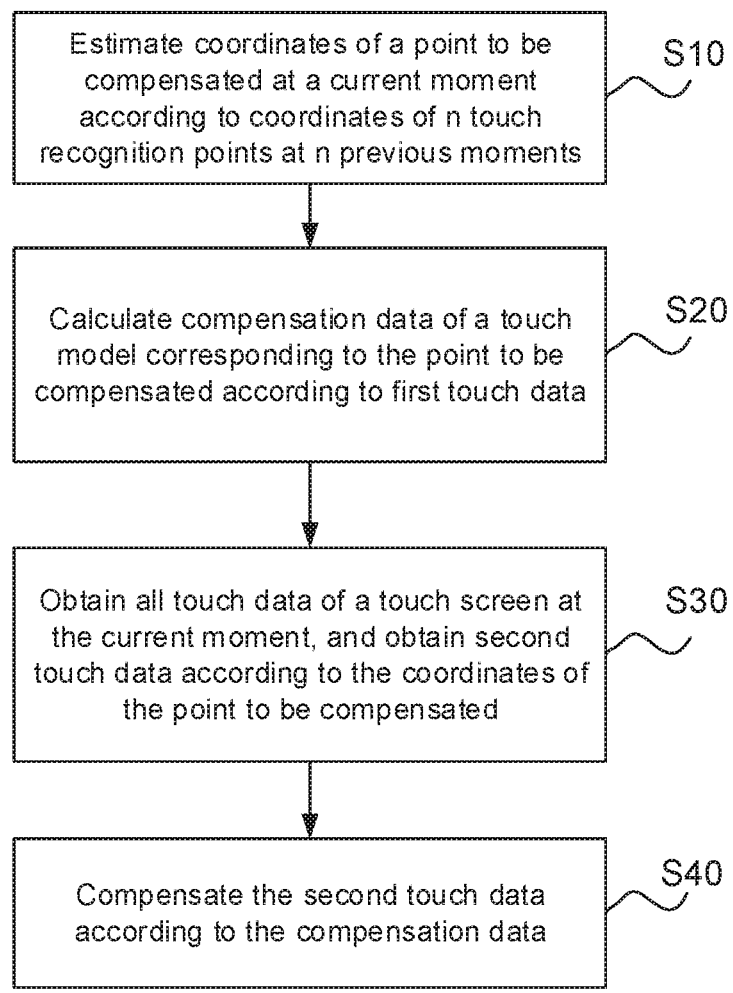
FIG. 3 is a flow chart of a touch compensation method, according to some embodiments of the present disclosure.

It will be noted that, referring to FIG. 2, there are multiple touch points 10 on the touch screen, and the touch screen collects touch data at each touch point 10. At a certain moment, after the touch screen has collected touch data at all the touch points 10, the touch screen will determine one or more touch points 10 as the touch recognition point(s) 1 at this moment according to the collected touch data. In the present disclosure, the "touch recognition point" refers to a contact point between the touch screen and a finger or a touch tool determined by the touch screen. Referring to FIG. 1, if the touch recognition point 1 determined by the touch screen and the actual contact point 2 are a same touch point 10, it means that the touch recognition of the touch screen is accurate this time. However, if the touch recognition point 1 and the actual touch point 2 are not a same touch point 10, or the touch screen fails to determine the actual touch point 2 as the touch recognition point 1, it means that the touch recognition of the touch screen is inaccurate this time. In this case, a problem of abnormal jitter or disconnection of the line described above will arise.

Some embodiments of the present disclosure provide a touch compensation method. Referring to FIGS. 3 to 6, the touch compensation method includes the following S10 to S40. For at least one line L, in S10, referring to FIG. 4, coordinates $(X_C, Y_C)$ of a point to be compensated $P_C$ at a current moment $T_0$ are estimated according to coordinates of n touch recognition points at n previous moments. The n previous moments before the current moment are $T_1$ to $T_n$, and n is an integer greater than or equal to 2.

Herein, the "point to be compensated" refers to a touch recognition point of the current moment $T_0$ that is estimated according to a trajectory of the line L composed of the n touch recognition points at the n previous moments. The estimated touch recognition point will be compensated, that is, the estimated touch recognition point will be used as the point to be compensated $P_C$ of the current moment $T_0$. The point to be compensated $P_C$ is obtained through estimation, and the coordinates of the point to be compensated $P_C$ may coincide with coordinates of an actual contact point at the current moment $T_0$ or coordinates of a touch recognition point determined by the touch screen, or may not coincide with the coordinates of the actual contact point at the current time $T_0$ or the coordinates of the touch recognition point determined by the touch screen.

In addition, the n previous moments $T_1$ to $T_n$ before the current moment refer to a previous 1st moment $T_1$ to a previous nth moment $T_n$, which correspond to the n touch recognition points $P_1(X_1, Y_1)$ to $P_n(X_n, Y_n)$, respectively. Herein, the previous 1st moment $T_1$ refers to a 1st moment counted backwards from the current moment $T_0$, and the previous nth moment $T_0$ refers to an nth moment counted backwards from the current moment $T_0$.

Figure 5:
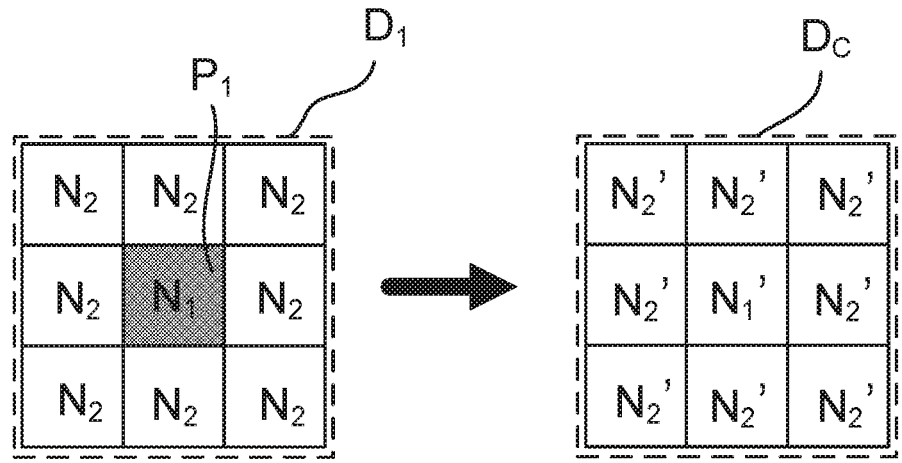
FIG. 5 is a schematic diagram showing how to calculate compensation data in a touch compensation method, according to some embodiments of the present disclosure.

In S20, referring to FIG. 5, compensation data $D_C$ of a touch model corresponding to the point to be compensated $P_C$ is calculated according to first touch data $D_1$ of a touch model corresponding to the touch recognition point $P_1$ of the previous 1st moment $T_1$.

It will be noted that, the "touch model" described above is used for the touch screen to determine the touch recognition point according to the collected touch data. The touch screen will identify a touch model according to the collected touch data. In a case where touch data at a plurality of touch points meets certain pre-set conditions, the touch screen will identify the plurality of touch points as a touch model, and determine a touch recognition point at a certain moment according to the touch model.

Figure 6:
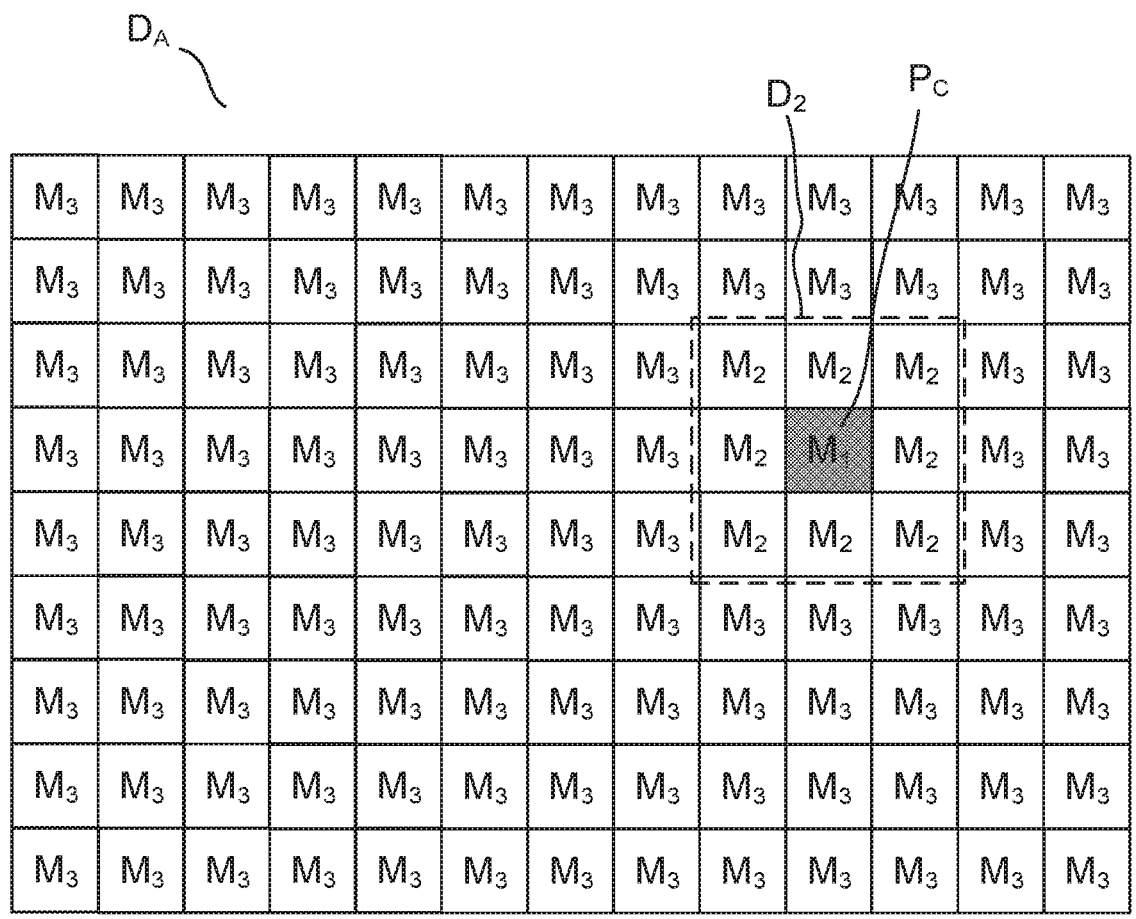
FIG. 6 is a schematic diagram showing how to obtain second touch data in a touch compensation method, according to some embodiments of the present disclosure.

In S30, referring to FIG. 6, all touch data DA of the touch screen at the current moment is obtained. Second touch data $D_2$ at the current moment $T_0$ at a place where the touch model corresponding to the point to be compensated $P_C$ is located is obtained from the all touch data $D_A$ according to the coordinates $(X_C, Y_C)$ of the point to be compensated $P_C$.

The all touch data $D_A$ refers to touch data at all touch points collected by the touch screen at the current moment $T_0$. The touch screen will determine the touch recognition points according to the all touch data $D_A$. It will be noted that, in the foregoing description, it is described that "a touch signal of the touch screen may be interfered by other signals inside the touch screen and external signals". After the touch signal is interfered, the interference will cause the touch data at some touch points in the all touch data $D_A$ to be inaccurate. The all touch data $D_A$ is divided according to distances from the touch points to the point to be compensated PC, and the all touch data $D_A$ includes: touch data $M_1$ at the point to be compensated $P_C$, touch data $M_2$ at touch points around the point to be compensated $P_C$, and touch data $M_3$ at touch points away from the point to be compensated $P_C$.

The coordinates $(X_C, Y_C)$ of the point to be compensated $P_C$ are already obtained in S10. The touch data $M_1$ at the current moment at the point to be compensated $P_C$ and the touch data $M_2$ at the touch points around the point to be compensated $P_C$ may be obtained in S30 according to the coordinates $(X_C, Y_C)$. These touch data constitutes the second touch data $D_2$.

In S40, the second touch data $D_2$ is compensated according to the compensation data $D_C$.

In some embodiments of the present disclosure, an order of S20 and S30 is not specifically limited. For example, as shown in FIG. 2, S20 is performed first, and then S30 is performed. That is, compensation data $D_C$ is calculated first, and then all touch data $D_A$ is obtained, and second touch data $D_2$ is obtained from the all touch data $D_A$. For another example, S30 is performed first, and then S20 is performed. That is, the all touch data $D_A$ is obtained first, and the second touch data $D_2$ is obtained from the all touch data $D_A$, and then the compensation data $D_C$ is calculated.

In the touch compensation method described above, for each line L, a time interval between touch recognition points at adjacent moments determined by the touch screen is relatively short, and a distance between the touch recognition points at the adjacent moments is relatively small. Therefore, the touch recognition point of the current moment $T_0$ estimated according to the coordinates of the n touch recognition points $P_1(X_1, Y_1)$ to $P_n(X_n, Y_n)$ at the n previous moments, i.e., a previous trajectory of the line, is relatively proximate to the actual touch recognition point of the current moment $T_0$. Moreover, there is a certain continuity in touch data of touch recognition points located on a same line L. For example, when a same finger or a same touch tool is used to draw lines, distribution of the touch data of the touch models corresponding to touch recognition points on the same line L is relatively close to each other. For another example, the touch data of the touch recognition points at adjacent moments on the same line L rarely changes drastically. Therefore, in a case where the touch data collected at the current moment $T_0$ is interfered by other signals inside the touch screen and external signals, the second touch data $D_2$ is compensated according to the compensation data $D_C$ calculated based on the first touch data $D_1$ of the previous 1st moment $T_1$. In other words, by compensating the second touch data $D_2$ of the current moment $T_0$ according to the trajectory and touch data of the line L before the current moment $T_0$, it may be possible to reduce an influence of the interference on the accuracy of the touch screen in determining the touch recognition points, and thereby improving the touch recognition accuracy of the touch screen.

Figure 7:
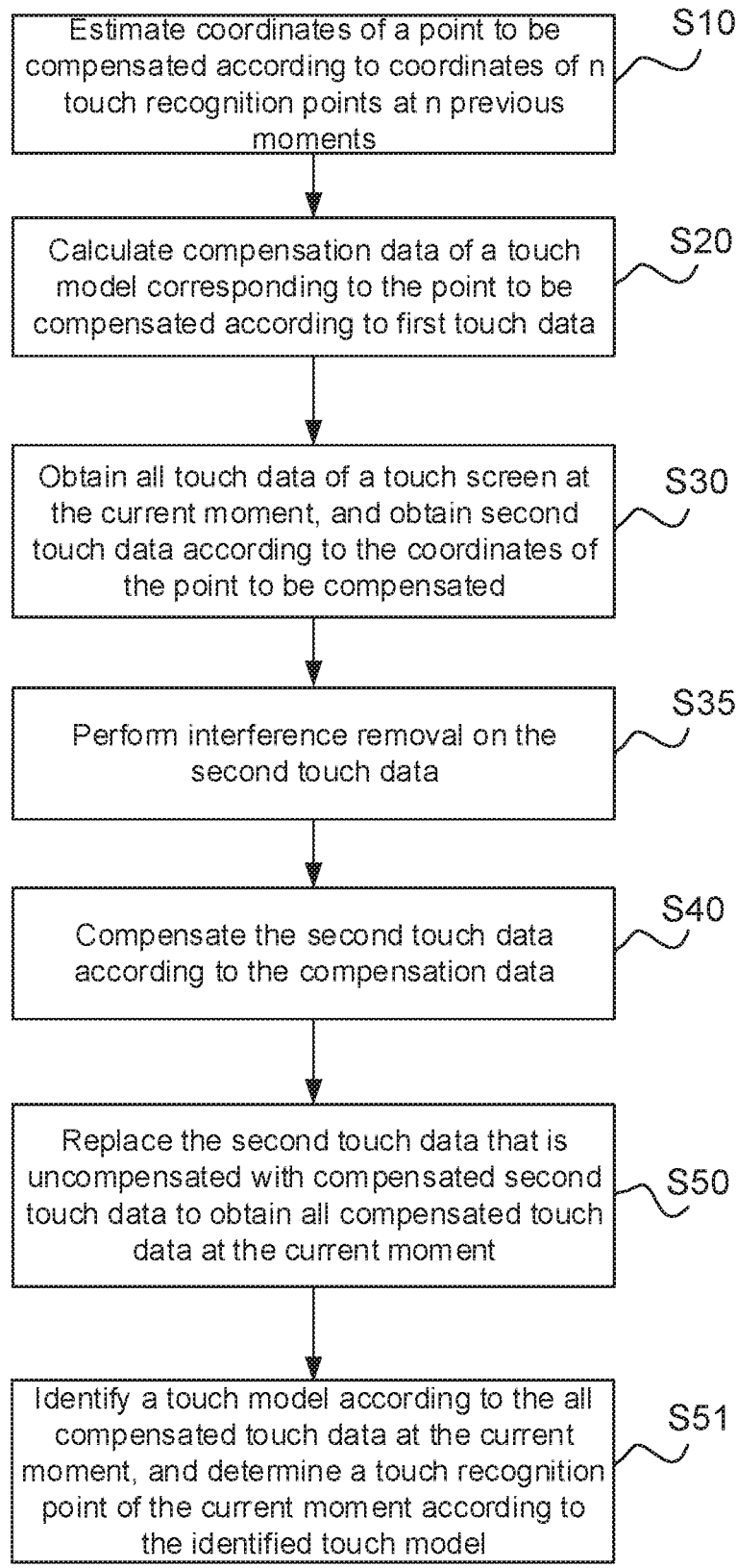
FIG. 7 is a flow chart of another touch compensation method, according to some embodiments of the present disclosure.

On this basis, in some embodiments, referring to FIG. 7, before S40, the touch compensation method further includes the following step.

In S35, interference removal is performed on the second touch data $D_2$.

Herein, S35 needs to be performed after S30. That is, the second touch data $D_2$ needs to be obtained first, and then the interference removal is performed on the second touch data $D_2$.

In this way, by performing the interference removal on the obtained second touch data $D_2$ before the step of compensating the second touch data $D_2$ according to the compensation data $D_C$ in S40, it may be possible to reduce the influence of the interference of other signals inside the touch screen and external signals on the determination of touch recognition points; therefore, the touch recognition accuracy of the touch screen may be further improved.

For example, the step of performing the interference removal on the second touch data in S35 includes: multiplying the second touch data $D_2$ by an interference removal coefficient. Herein, the interference removal coefficient is greater than 0 and less than 1.

In some embodiments, the interference removal coefficient is in a range from 0.5 to 1. For example, the interference removal coefficient is 0.8.

Therefore, in the case where the touch data collected at the current moment $T_0$ is interfered by other signals inside the touch screen and external signals, by multiplying the second touch data $D_2$ by the interference removal coefficient that is less than 1, it may be possible to reduce a deviation between the second touch data and the actual touch data, thereby reducing the influence of the interference on the determination of touch recognition points.

In some embodiments, S10 includes:

calculating the coordinates $(X_C, Y_C)$ of the point to be compensated $P_C$ according to the following formulas (1) and (2):

$$X_C = X_1 + \sum_{k=1}^{n-1} A_k \cdot (X_k - X_{k+1}); \quad (1)$$

$$Y_C = Y_1 + \sum_{k=1}^{n-1} A_k \cdot (Y_k - Y_{k+1}); \quad (2)$$

Herein, $X_k$ represents an abscissa of a touch recognition point $P_1$ $(X_k, Y_1)$ at a previous kth moment $T_k$, and $Y_k$ represents an ordinate of the touch recognition point $P_k$ $(X_k, Y_k)$ at the previous kth moment $T_k$. $A_k$ represents a weight coefficient corresponding to differences between coordinates of a touch recognition point $P_k$ $(X_k, Y_k)$ at a previous kth moment $T_k$ before the current moment among the n touch recognition points and coordinates of a touch recognition point $P_k+(X_k+1, Y_k+)$ at a previous (k+1)th moment $T_k+1$ before the current moment among the n touch recognition points, $$\sum_{k=1}^{n-1} A_k = 1,$$

and $A_1 > A_2 > \ldots > A_{n-1}$.

Figure 4:
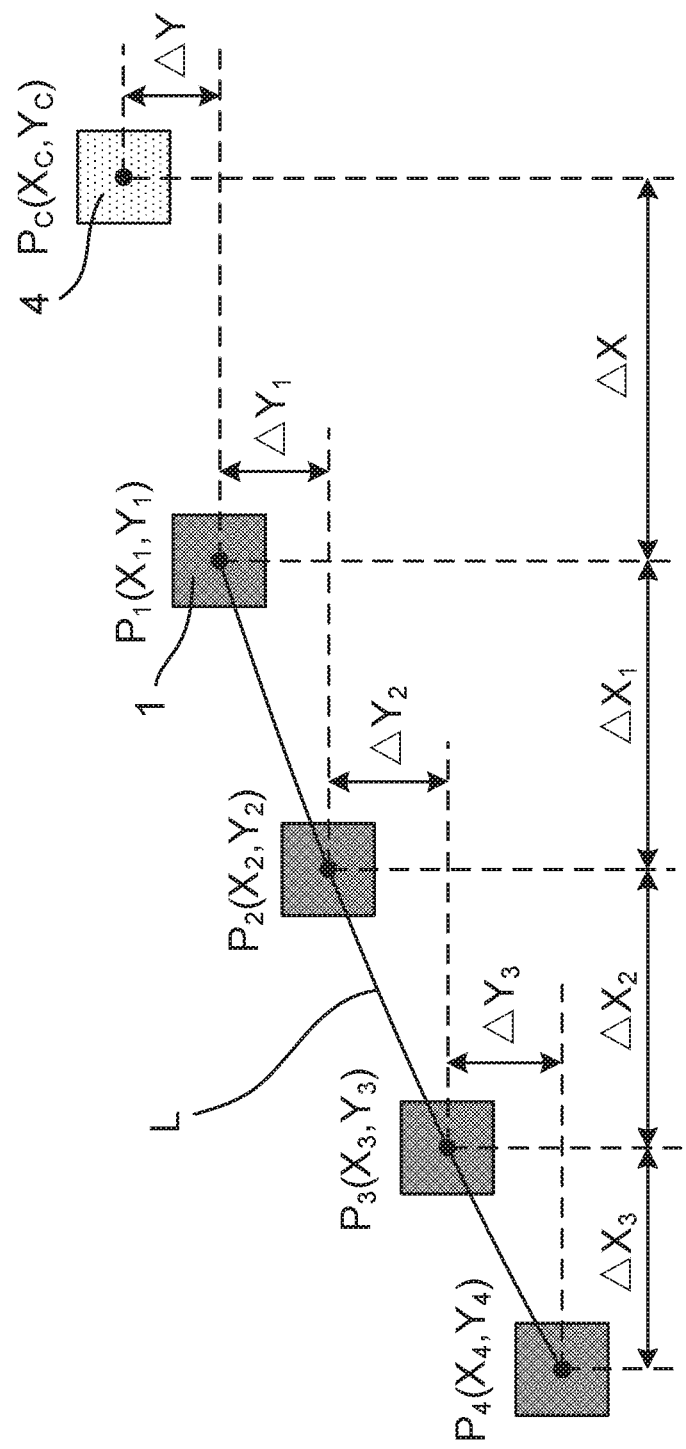
FIG. 4 is a schematic diagram showing how to estimate coordinates of a point to be compensated in a touch compensation method, according to some embodiments of the present disclosure.

For example, referring to FIG. 4, with the touch recognition point $P_1(X_1, Y_1)$ of the previous 1st moment $T_1$ and the touch recognition point $P_2(X_2, Y_2)$ of the previous 2nd moment $T_2$ as an example, $A_1$ represents a weight coefficient corresponding to differences between coordinates of $P_1(X_1, Y_1)$ and $P_2(X_2, Y_2)$, i.e., a weight coefficient corresponding to $\Delta X_1$ and $\Delta Y_1$.

As such, distances among the touch recognition points (including distances between the abscissas and distances between the ordinates) of the n previous moments on the line L are calculated according to a weight of a certain coefficient, so as to obtain differences between the coordinates of the point to be compensated $P_C$ and the coordinates of the touch recognition point $P_1$ of the previous 1st moment $T_1$ (including a difference $\Delta X$ between the abscissas and a difference $\Delta Y$ between the ordinates). The differences are then used to estimate the coordinates of the touch recognition point of the current moment $T_0$. That is, the coordinates $(X_C, Y_C)$ of the point to be compensated $P_C$ are obtained.

It will be noted that, $A_1 > A_2 > \ldots > A_{n-1}$. In this way, it may be possible to ensure that when $\Delta X$ and $\Delta Y$ are calculated, more weight is given to the distance between the touch recognition points relatively close to the point to be compensated $P_C$, and less weight is given to the distance between the touch recognition points relatively far away from the point to be compensated $P_C$.

A value of $A_k$ may be set according to actual touch recognition needs, which is not specifically limited here. For example, $A_1$ may be set to be greater than 0.5. For example, in a case where n is equal to 4, $A_1$ is equal to 0.6, $A_2$ is equal to 0.3, and $A_3$ is equal to 0.1.

Figures 8, 9:
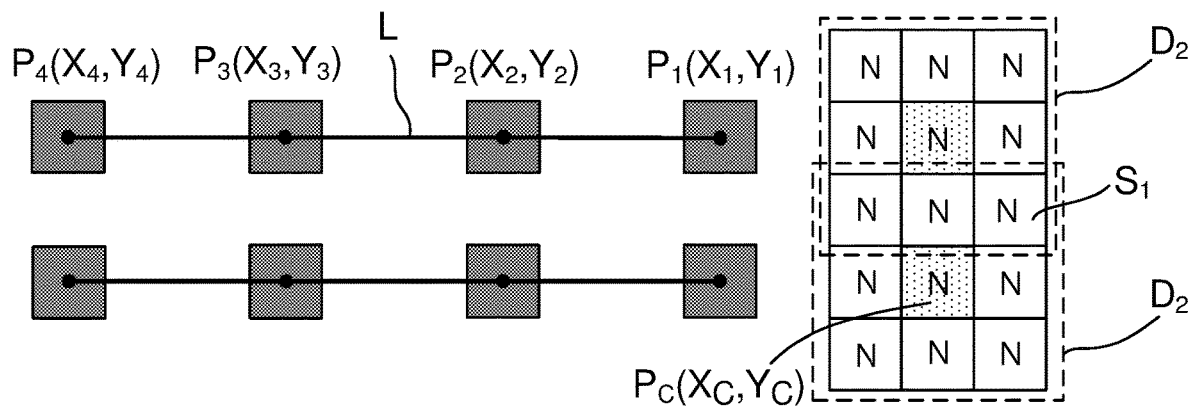
FIG. 8 is a schematic diagram showing a touch compensation method in a case where there is an overlapping region between touch models corresponding to points to be compensated of different lines, according to some embodiments of the present disclosure.
FIG. 9 is a schematic diagram showing a touch compensation method in a case where there is an overlapping region between second touch data of points to be compensated of different lines, according to some embodiments of the present disclosure.

In some embodiments, referring to FIG. 8, in a case where there are at least two lines L, and there is an overlapping region $S_1$ between the second touch data $D_2$ of the touch models corresponding to the points to be compensated $P_C$ of two adjacent lines L, in S40, a part of the second touch data $D_2$ that is located in the overlapping region $S_1$ is compensated according to compensation data $D_C$ of any one of the points to be compensated $P_C$ of the two adjacent lines L. In other words, the part of second touch data $D_2$ that is located in the overlapping region $S_1$ is compensated only once, and will not be compensated repeatedly just because the touch data located in the overlapping region $S_1$ belongs to the second touch data $D_2$ of touch models corresponding to two points to be compensated $P_C$.

On this basis, in some embodiments, referring to FIG. 5, the compensation data $D_C$ includes: central compensation data $N_1'$ calculated based on touch data $N_1$ of a central point in the first touch data $D_1$, and peripheral compensation data $N_2'$ calculated based on touch data $N_2$ of peripheral points in the first touch data $D_1$.

The touch data $N_1$ of the central point in the first touch data $D_1$ is touch data of the touch recognition point $P_1$ of the previous 1st moment $T_1$, and the touch data $N_2$ of the peripheral points in the first touch data $D_1$ is touch data of other touch points around the touch recognition point $P_1$ of the previous 1st moment $T_1$.

Multiplying the touch data $N_1$ of the central point in the first touch data $D_1$ and a central compensation coefficient $n_1$, and a product obtained is used as the central compensation data $N_1'$, i.e., $N_1' = N_1 \times n_1$. Multiplying the touch data $N_2$ of peripheral points in the first touch data $D_1$ and a peripheral compensation coefficient $n_2$, and a product obtained is used as the peripheral compensation data $N_2'$, i.e., $N_2' = N_2 \times n_2$. The central compensation coefficient $n_1$ is greater than or equal to the peripheral compensation coefficient $n_2$.

It will be noted that, the capacitance at the actual contact point changes greatly, while the capacitance at touch points located in a peripheral region around the actual contact point only changes slightly. In other words, the touch data at the actual touch point is greater than the touch data at other touch points around the actual touch point, which enables the touch screen to determine the touch recognition point: among all the touch data $D_A$ collected by the touch screen, when touch data of a touch point is greater than touch data of other touch points around the touch point, the touch screen will identify the touch point and the other touch points around the touch point as a touch model, and the touch point with the largest touch data is determined as a touch recognition point. For example, in the first touch data $D_1$ shown in FIG. 5, $N_1$ is greater than $N_2$.

In a case where the number of the at least one line L is greater than or equal to 2, for example, in a case where the second touch data $D_2$ of the touch screen is as shown in FIG. 9, the touch screen will identify three touch models and thus determine three touch recognition points. In a case where there is an overlapping region $S_2$ between second touch data $D_2$ of touch models corresponding to two of the three touch recognition points, the touch data collected in the overlapping region $S_2$ may be formed by superimposing respective touch data of two actual contact points. The superimposed touch data may be greater than or equal to the touch data at the actual touch point, resulting in the touch screen being unable to correctly identify the touch model and thus determining the touch recognition points incorrectly (for example, the touch screen may determine a touch point in the overlapping region $S_2$ as a touch recognition point).

In this case, in the touch compensation method as described above, the central compensation coefficient $n_1$ is greater than or equal to the peripheral compensation coefficient $n_2$. In other words, the touch data $M_1$ of the point to be compensated $P_C$ will be compensated to a greater extent than the touch data $M_2$ of touch points around the point to be compensated $P_C$. In this way, after the second touch data $D_2$ is compensated according to the compensation data $D_C$, it may be possible to reduce a probability of the touch screen determining the touch recognition points incorrectly due to the fact that the touch data collected in the overlapping region $S_2$ is the superimposed touch data. Therefore, the touch recognition accuracy of the touch screen may be further improved.

For example, the central compensation coefficient $n_1$ is in a range of 0.2 to 0.8, and the peripheral compensation coefficient $n_2$ is in a range of 0.1 to 0.7. For example, the central compensation coefficient $n_1$ is 0.32, and the peripheral compensation coefficient $n_2$ is 0.24.

In some embodiments, referring to FIGS. 6 and 9, in a case where the second touch data $D_2$ includes: touch data $M_1$ of a central point and touch data $M_2$ of peripheral points, S40 includes:

correspondingly adding the central compensation data $N_1'$ to the touch data $M_1$ of the central point in the second touch data $D_2$, that is, touch data of the central point that is compensated is $(N_1' + M_1)$; and adding the peripheral compensation data $N_2'$ to the touch data $M_2$ of the peripheral points in the second touch data $D_2$, that is, touch data of the peripheral points that is compensated is $(N_2' + M_2)$.

Figure 10:
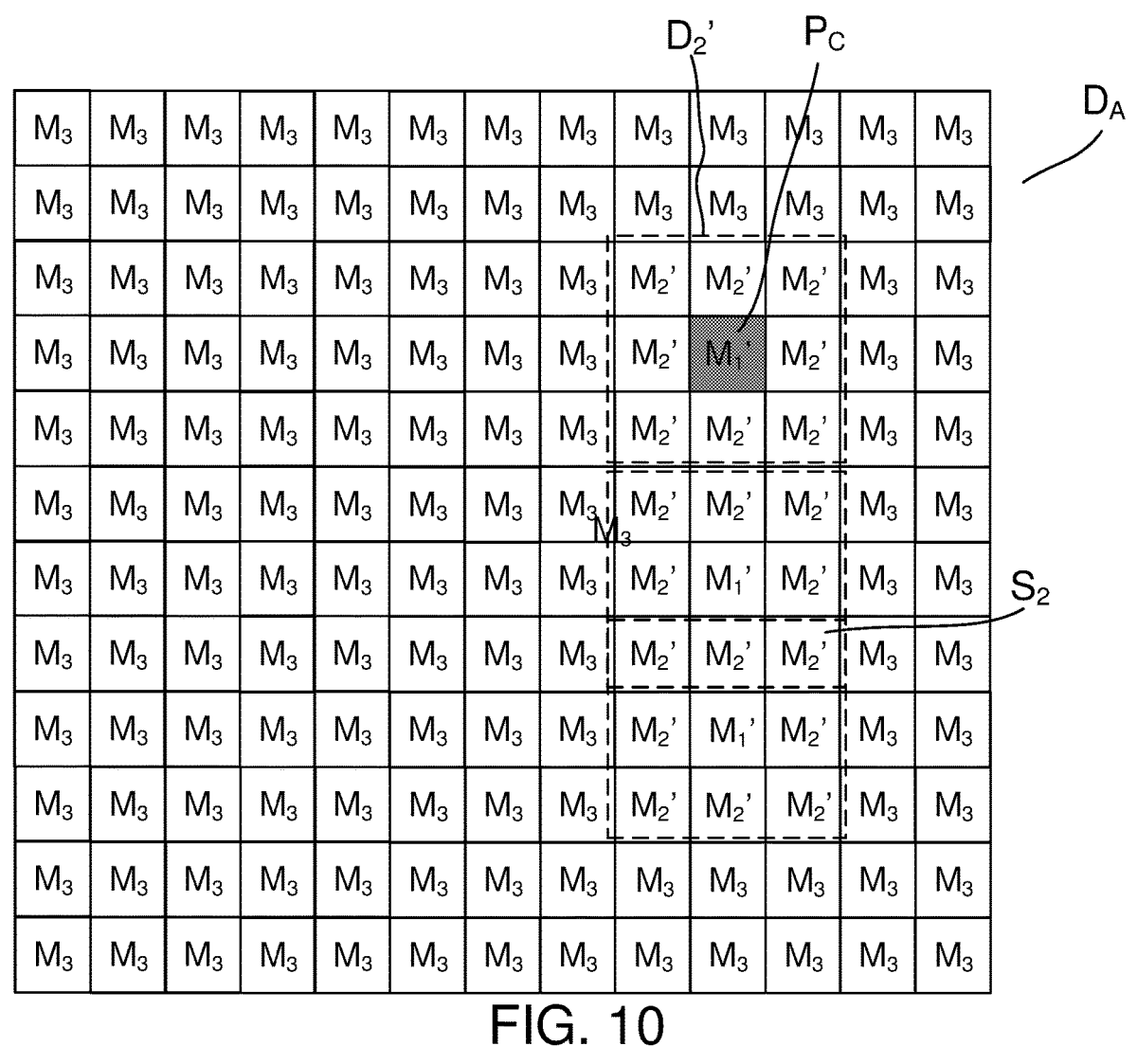

In some embodiments, referring to FIG. 10, in the touch compensation method as described above, in a case where S35 is performed, that is, in a case where the second touch data $D_2$ is obtained and the interference removal is performed on the second touch data $D_2$, in S40, after the central compensation data $N_1'$ is correspondingly added to the touch data $M_1'$ of the central point in the second touch data $D_2'$ that is obtained after the interference removal, the touch data of the central point after the compensation is: ($N1'+M1'$); and after the peripheral compensation data $N_2'$ is correspondingly added to the touch data $M_2$ of the peripheral touch points in the second touch data $D_2'$ that is obtained after the interference removal, the touch data of the peripheral points after the compensation is: ($N2'+M2'$).

In some embodiments, referring to FIG. 7, after S40, the touch compensation method further includes the following steps.

In S50, the uncompensated second touch data $D_2$ is replaced with compensated second touch data $D2''$ to obtain all compensated touch data $D_A'$ of the current moment $T_0$.

In S51, the touch model of the current moment $T_0$ is identified according to the all compensated touch data $D_A'$ of the current moment $T_0$, and the touch recognition point $P_0$ of the current moment $T_0$ is determined according to the identified touch model of the current moment $T_0$.

For example, S51 includes:

among the all compensated touch data $D_A'$ of the current moment $T_0$, if touch data of a touch point is greater than touch data of other touch points around the touch point, then the touch point and the other touch points around the touch point are identified as the touch model, and a central point of the touch model is determined to be the touch recognition point $P_0$ of the current moment $T_0$.

The shape of the touch model, the number of touch points included in the touch model, and the distribution of touch data of the touch points included in the touch model are not specifically limited here. The touch model may be set according to actual needs. For example, referring to FIG. 5, the touch model is a 9-box matrix composed of 9 touch points and their touch data, and the touch data $N_1$ of the central point of the touch model is greater than the touch data $N_2$ of the peripheral points. For example, the touch model may also be a 25-box matrix composed of 25 touch points and their touch data, and the touch data $N_1$ of the central point is greater than the touch data $N_2$ of the peripheral points. In addition, the touch model may be designed according to actual needs according to a specific arrangement of touch points in different touch screens.

The touch compensation method will be described with examples below with reference to FIGS. 11 to 17. Herein, an example is taken in which there are 3 lines L, the coordinates of the point to be compensated $P_C$ are calculated according to coordinates of 4 touch points of 4 previous moments, and the touch model is the 9-box matrix as described above.

Figure 11:
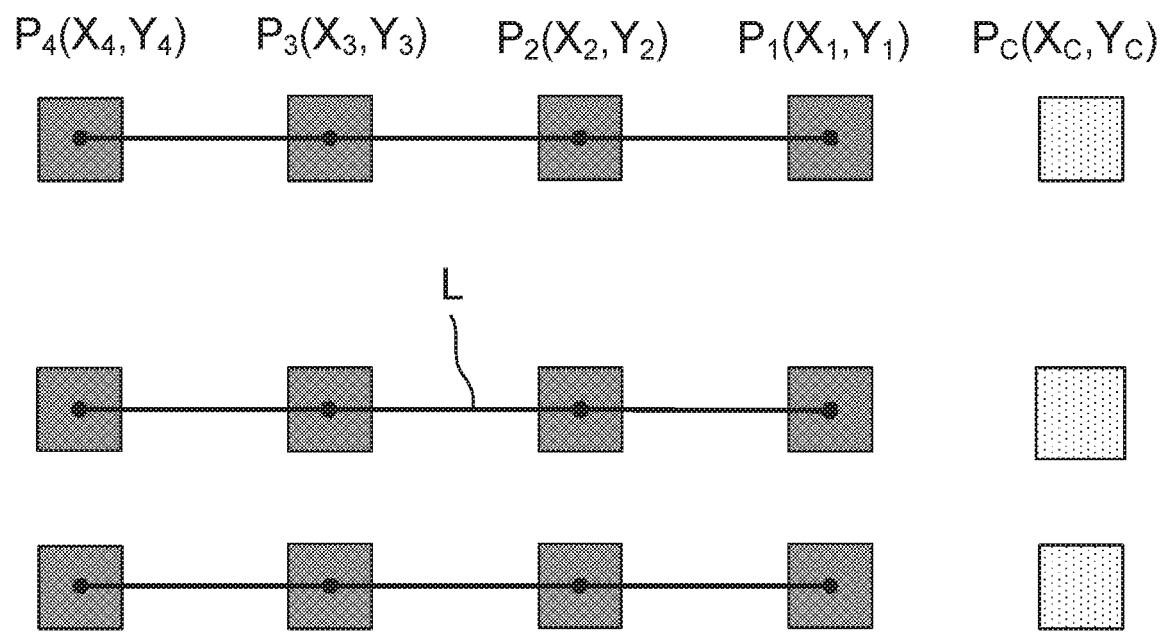

As shown in FIG. 11, for each of the three lines L, the coordinates $(X_C, Y_C)$ of the point to be compensated $P_C$ are calculated according to the following formulas (3) and (4) based on the coordinates $(X_1, Y_1)$, $(X_2, Y_2)$, $(X_3, Y_3)$ and $(X_4, Y_4)$ of the 4 touch recognition points $P_1$, $P_2$, $P_3$ and $P_4$ of the 4 previous moments:

$$X_C = X_1 + 0.6(X_1-X_2) + 0.3(X_2-X_3) + 0.1(X_3-X_4) \quad (3);$$

$$Y_C = Y_1 + 0.6(Y_1-Y_2) + 0.3(Y_2-Y_3) + 0.1(Y_3-Y_4) \quad (4).$$

It will be noted that, the formula (3) is obtained in a case where $A_1$ is set to 0.6, $A_2$ is set to 0.3, and $A_3$ is set to 0.1 in the formula (1), and the formula (4) is obtained in a case where $A_1$ is set to 0.6, $A_2$ is set to 0.3, and $A_3$ is set to 0.1 in the formula (2).

Figure 12:
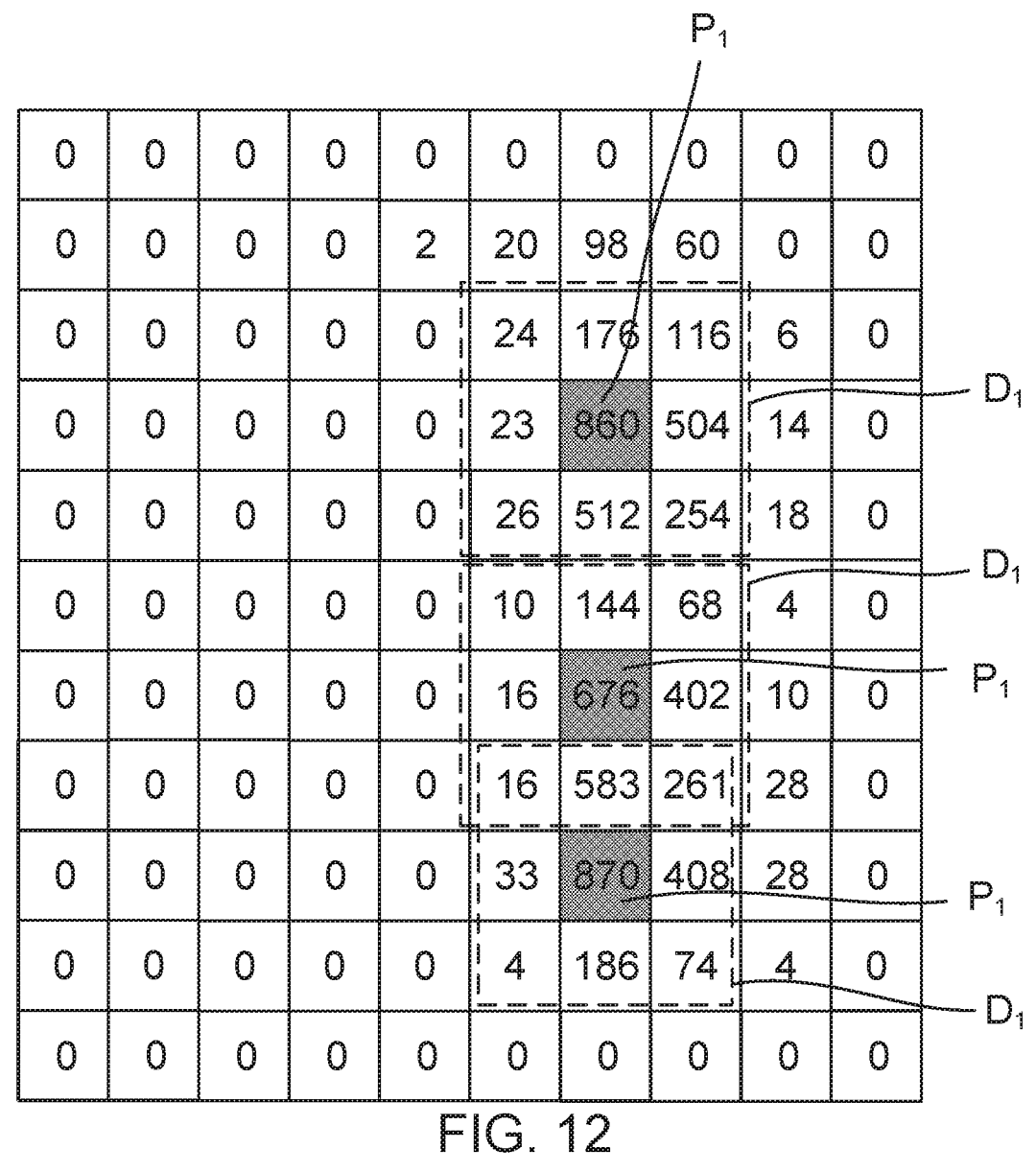

As shown in FIGS. 12 and 13, the compensation data $D_C$ of the touch model corresponding to the point to be compensated $P_C$ of each line L is calculated according to the first touch data $D_1$ of the touch model corresponding to the touch recognition point $P_1(X_1, Y_1)$ of the previous 1st moment $T_1$ of each line L.

In an example where the central compensation coefficient $n_1$ is 0.32 and the peripheral compensation coefficient $n_2$ is 0.24, the touch data $N_1$ of the central point and the touch data $N_2$ of 8 peripheral points of each compensation data $D_C$ in FIG. 13 may be obtained through calculation. For example, in FIG. 11, the touch data $N_1$ of the central point in the first touch data $D_1$ of an uppermost line L is 860, then the central compensation data $N_1'$ is calculated to be: $N_1'=0.32\times 860=275$; the touch data $N_2$ of a peripheral point located to the right of the central point (which is 504) is taken as an example, then the corresponding peripheral compensation data $N_2'$ is calculated to be: $N_2'=0.24\times 504=121$.

Figure 14:
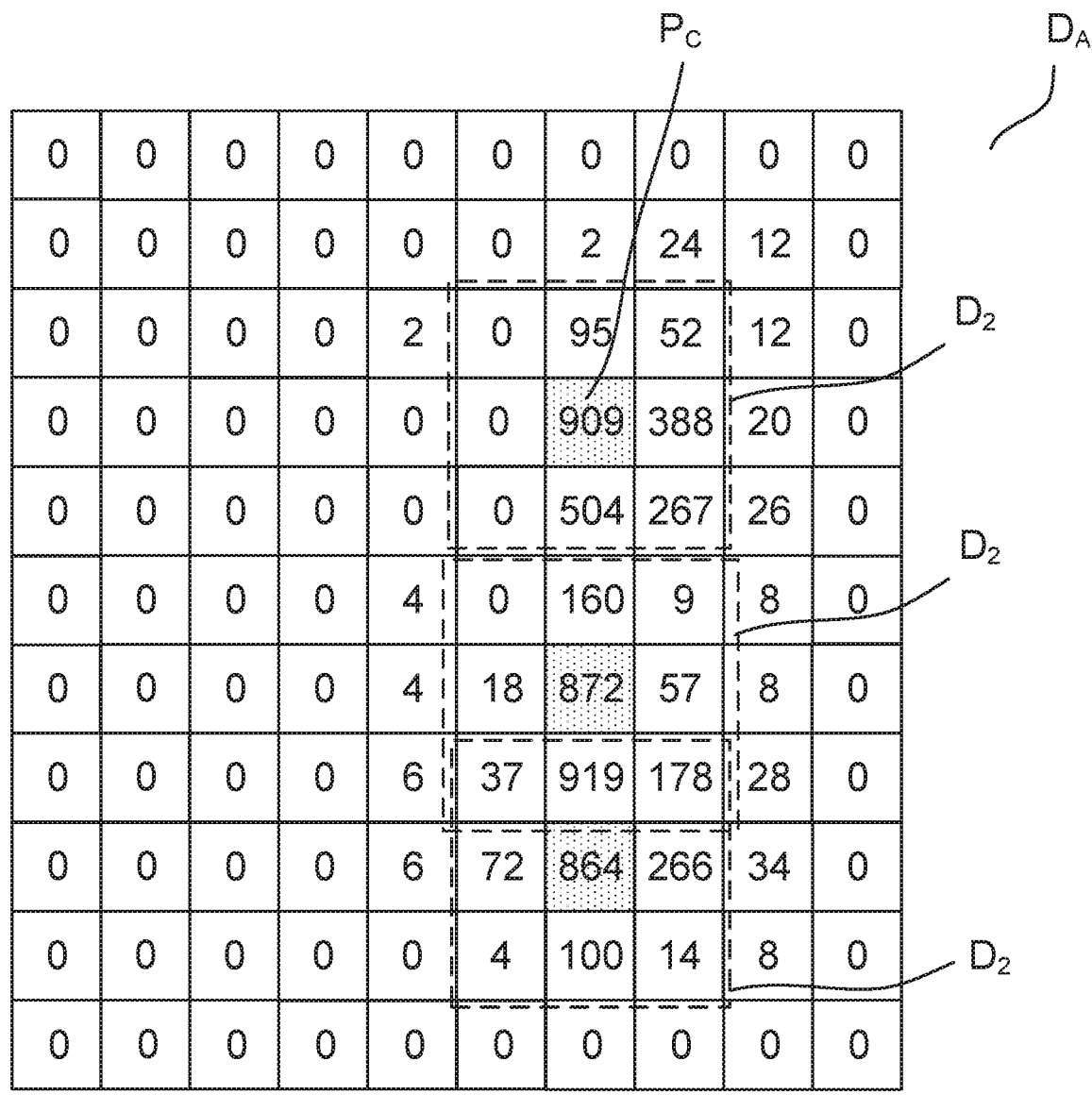

Referring to FIG. 14, the all touch data $D_A$ of the touch screen at the current moment is obtained, and the second touch data $D_2$ of the current moment at the place where the touch model corresponding to each point to be compensated $P_C$ is located is obtained from the all touch data $D_A$ according to the coordinates $(X_C, Y_C)$ of the point to be compensated $P_C$ of each line L.

Figure 15:
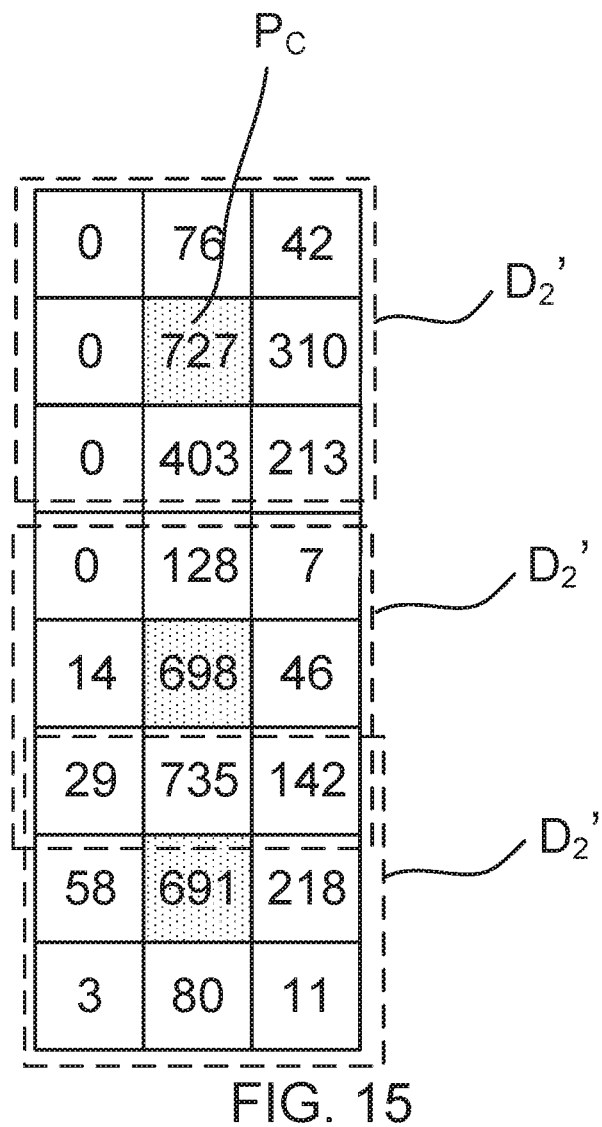

Referring to FIG. 15, in an example where the interference removal coefficient is 0.8, the second touch data $D_2$ is multiplied by the interference removal coefficient of 0.8, so as to perform the interference removal on the second touch data $D_2$. For example, in FIG. 11, the touch data $M_1$ of the central point of the second touch data $D_2$ of the uppermost line L is 909. After the interference removal is performed on the second touch data $D_2$, the touch data $M_1'$ of the central point is 727. The touch data $M_2$ of the peripheral point to the right of the central point is 388. After the interference removal is performed on the second touch data $D_2$, the touch data $M_2'$ of the peripheral point is 310.

Figure 16:
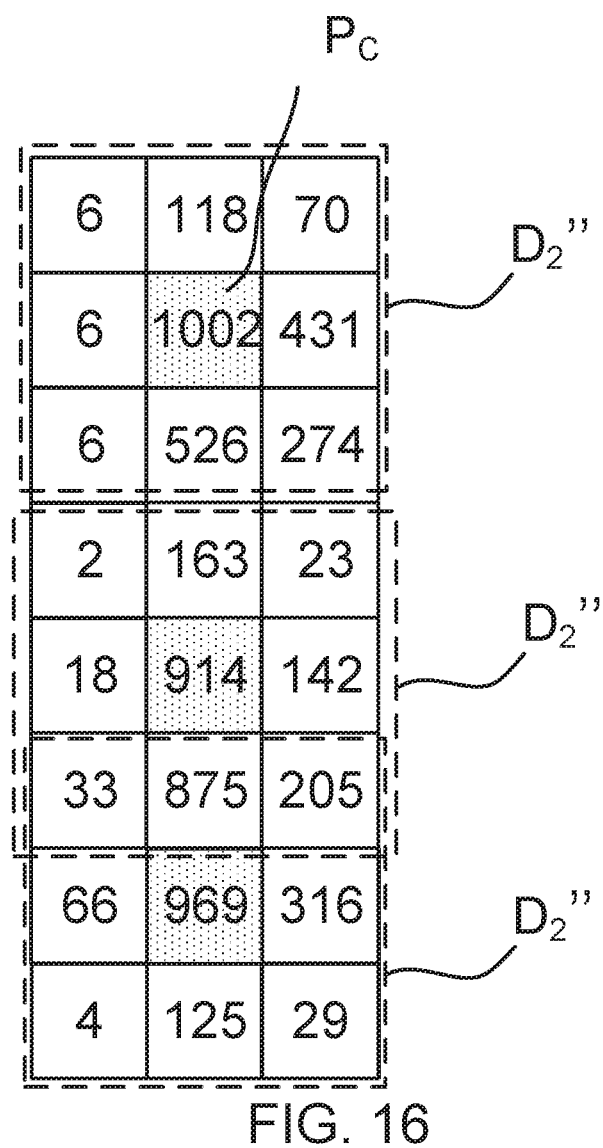

Referring to FIG. 16, compensating the second touch data $D_2'$ which is obtained after the interference removal includes: adding the central compensation data $N_1'$ to the touch data $M_1'$ of the central point in the second touch data $D_2'$ that is obtained after the interference removal correspondingly, and adding the peripheral compensation data $N_2'$ to the touch data $M_2$ of the peripheral points in the second touch data $D_2$ that is obtained after the interference removal correspondingly. For example, the touch data of the central point of the uppermost line L in FIG. 11 after the compensation is: $275+727=1002$; and the touch data of the peripheral point to the right of the central point after the touch compensation is: $121+310=431$.

Referring to FIG. 17, the second touch data $D_2'$ that is uncompensated is replaced with the compensated second touch data $D_2''$ to obtain the all compensated touch data $D_A'$ at the current moment $T_0$.

Referring to FIG. 18, the touch model Mod of the current moment $T_0$ is identified according to the all compensated touch data $D_A'$ at the current moment $T_0$, and the touch recognition point $P_0$ of the current moment $T_0$ is determined according to the identified touch model Mod of the current moment $T_0$. For example, among the all compensated touch data $D_A'$, touch data of a touch point, which is 1002, is greater than touch data of other touch points around the touch point, then the touch point with the touch data of 1002 is determined as the touch recognition point $P_0$ of the current moment $T_0$.

Figure 19:
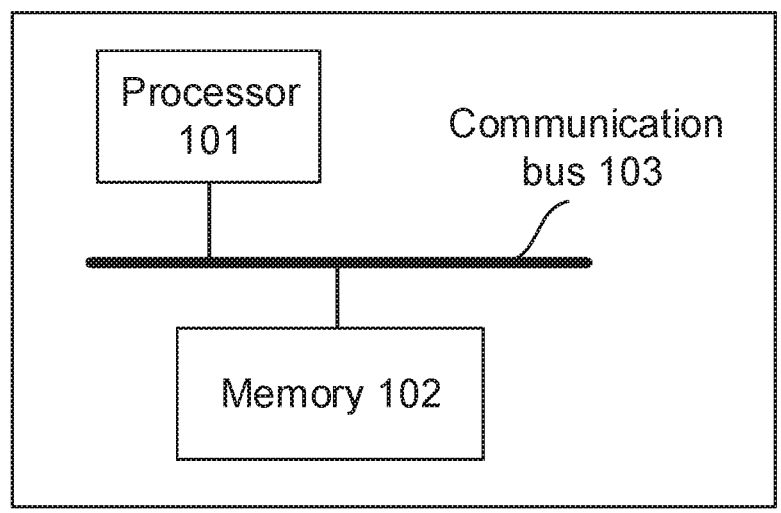
FIG. 19 is a structural diagram of a touch compensation apparatus, according to some embodiments of the present disclosure.

In some embodiments of the present disclosure, referring to FIG. 19, a touch compensation apparatus 100 is further provided. The touch compensation apparatus includes: a processor 101 and a memory 102. The memory 102 stores program instructions that are executable. When the program instructions are executed by the processor 101, the touch compensation apparatus 100 is caused to perform the following steps.

The coordinates $(X_C, Y_C)$ of the point to be compensated $P_C$ of the current moment $T_0$ are estimated according to the coordinates of the n touch recognition points at the n previous moments. The n previous moments before the current moment are $T_1$ to $T_n$, and n is an integer greater than or equal to 2.

The compensation data $D_C$ of the touch model corresponding to the point to be compensated $P_C$ is calculated according to the first touch data $D_1$ of the touch model corresponding to the touch recognition point $P_1$ of the previous 1st moment $T_1$.

The all touch data $D_A$ of the touch screen at the current moment $T_0$ is obtained, and the second touch data $D_2$ at the current moment $T_0$ at the place where the touch model corresponding to the point to be compensated $P_C$ is located is obtained from the all touch data $D_A$ according to the coordinates $(X_C, Y_C)$ of the point to be compensated $P_C$.

The second touch data $D_2$ is compensated according to the compensation data $D_C$.

The touch compensation apparatus 100 may be able to reduce the influence of interference on the accuracy of the touch screen in determining the touch recognition points, thereby improving the touch recognition accuracy of the touch screen. This effect has been described in detail in some embodiments of the touch compensation method provided in the present disclosure, and will not be elaborated herein again.

In some embodiments, the touch compensation apparatus 100 further includes a communication bus 103. The processor 101 and the memory 102 are electrically connected via the communication bus 103, so as to realize transmission of data including the touch data.

Figure 20:
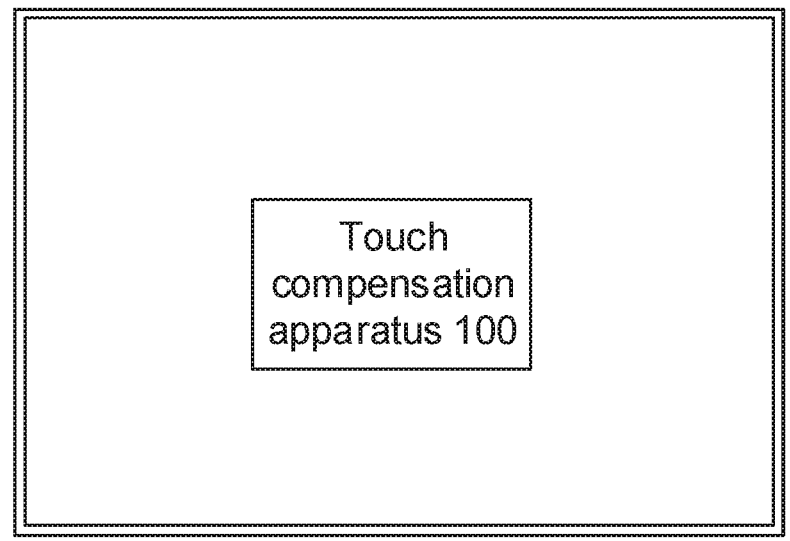
FIG. 20 is a structural diagram of a touch screen, according to some embodiments of the present disclosure.

Some embodiments of the present disclosure further provide a touch screen 1000. Referring to FIG. 20, the touch screen 100 includes the touch compensation apparatus 100 described above.

The touch screen 1000 may also be able to achieve the effect of reducing the influence of interference on the accuracy of the touch screen in determining the touch recognition points and thus improve the touch recognition accuracy of the touch screen, which will not be elaborated herein again.

Figure 21:
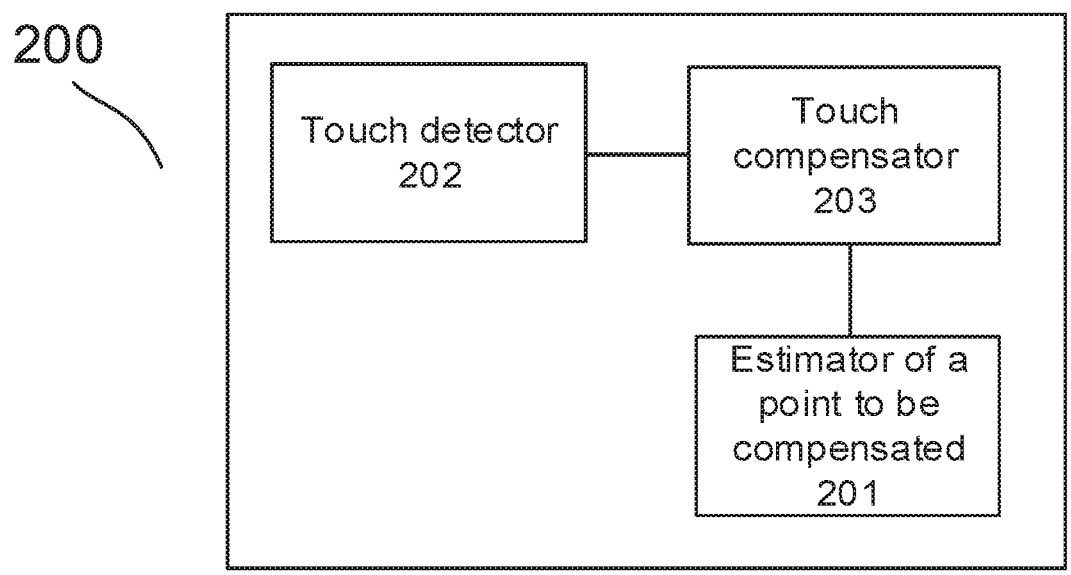
FIG. 21 is a structural diagram of another touch compensation apparatus, according to some embodiments of the present disclosure.

In some embodiments of the present disclosure, a touch compensation apparatus 200 is further provided. In a case where functional modules are divided according to respective functions, referring to FIG. 21, the touch compensation apparatus 200 includes: an estimator of the point to be compensated 201, a touch detector 202, and a touch compensator 203.

The estimator of the point to be compensated 201 is configured to: for the at least one line L, estimate the coordinates $(X_C, Y_C)$ of the point to be compensated $P_C$ at the current moment $T_0$ according to the coordinates of the n touch recognition points at the n previous moments. The n previous moments before the current moment are $T_1$ to $T_n$, and n is the integer greater than or equal to 2.

The touch detector 202 is configured to: obtain the all touch data $D_A$ of the touch screen at the current moment $T_0$.

The touch compensator 203 is configured to: calculate the compensation data $D_C$ of the touch model corresponding to the point to be compensated $P_C$ according to the first touch data $D_1$ of the touch model corresponding to the touch recognition point at the previous 1st moment $T_1$; obtain the second touch data $D_2$ at the current moment $T_0$ at the place where the touch model corresponding to the point to be compensated $P_C$ is located from the all touch data $D_A$ according to the coordinates $(X_C, Y_C)$ of the point to be compensated $P_C$; and compensate the second touch data $D_2$ according to the compensation data $D_C$.

The touch compensation apparatus 200 may also be able to achieve the effect of reducing the influence of interference on the accuracy of the touch screen in determining the touch recognition points and thus improve the touch recognition accuracy of the touch screen, which will not be elaborated herein again.

Some embodiments of the present disclosure provide a computer readable storage medium (for example, a non-transitory computer readable storage medium). The computer readable storage medium stores computer program instructions. When run by a processor, the computer program instructions cause the processor to perform one or more steps of the touch compensation method described in any one of the above embodiments.

The computer readable storage medium may also be able to achieve the effect of reducing the influence of interference on the accuracy of the touch screen in determining the touch recognition points and thus improve the touch recognition accuracy of the touch screen, which will not be elaborated herein again.

Exemplarily, the computer readable storage medium may include, but is not limited to: magnetic storage devices (e.g., hard disks, floppy disks, or magnetic tapes), optical disks (e.g., CDs (Compact Disks) and DVDs (Digital Versatile Disks)), smart cards, and flash memory devices (e.g., EPROM (Erasable Programmable Read-Only Memory), cards, sticks or key drivers). The various computer readable storage media described in the present disclosure may refer to one or more devices and/or other machine readable storage media for storing information. The term "machine readable storage medium" may include, but is not limited to, wireless channels and various other media capable of storing, containing, and/or carrying instructions and/or data.

Some embodiments of the present disclosure further provide a computer program product. The computer program product includes computer program instructions. When the computer program instructions are executed by a computer, the computer program instructions cause the computer to perform one or more steps of the touch compensation method described in any one of the above embodiments.

Some embodiments of the present disclosure further provide a computer program. When the computer program is executed by a computer, the computer program causes the computer to perform one or more steps of the touch compensation method described in any one of the above embodiments.

The beneficial effects of the computer readable storage medium, the computer program product and the computer program are the same as the beneficial effects of the touch compensation method described in some embodiments above, which will not be elaborated herein again.

The foregoing descriptions are merely some specific implementations of the present disclosure, but the protection scope of the present disclosure is not limited thereto. Any person skilled in the art could conceive of changes of replacements within the technical scope disclosed by the present disclosure, which shall all be included in the protection scope of the present disclosure. Therefore, the protection scope of the present disclosure shall be subject to the protection scope of the claims.

What is claimed is:

1. A touch compensation method, comprising: for at least one line,
estimating coordinates of a point to be compensated at a current moment according to coordinates of n touch recognition points at n previous moments, the n previous moments before the current moment being $T_1$ to $T_n$, and n being an integer greater than or equal to 2;
calculating compensation data of a touch model corresponding to the point to be compensated according to first touch data of a touch model corresponding to a touch recognition point of a previous 1st moment $T_1$;
obtaining all touch data of a touch screen at the current moment;
obtaining second touch data at the current moment at a place where the touch model corresponding to the point to be compensated is located from the all touch data according to the coordinates of the point to be compensated; and
compensating the second touch data according to the compensation data.

2. The touch compensation method according to claim 1, wherein before compensating the second touch data according to the compensation data, the touch compensation method further comprises:
performing interference removal on the second touch data.

3. The touch compensation method according to claim 2, wherein performing the interference removal on the second touch data includes:
multiplying the second touch data by an interference removal coefficient, the interference removal coefficient being greater than 0 and less than 1.

4. The touch compensation method according to claim 3, wherein the interference removal coefficient is in a range of 0.5 to 1.

5. The touch compensation method according to claim 4, wherein the interference removal coefficient is 0.8.

6. The touch compensation method according to claim 1, wherein estimating the coordinates of the point to be compensated at the current moment according to the coordinates of the n touch recognition points at the n previous moments includes:
calculating the coordinates ($X_C$, $Y_C$) of the point to be compensated according to the following formulas (1) and (2):

$$X_C = X_1 + \sum_{k=1}^{n-1} A_k \cdot (X_k - X_{k+1}); \quad (1)$$

$$Y_C = Y_1 + \sum_{k=1}^{n-1} A_k \cdot (Y_k - Y_{k+1}), \quad (2)$$

wherein $A_k$ represents a weight coefficient corresponding to differences between coordinates of a touch recognition point at a previous kth moment and a touch recognition point at a previous (k+1)th moment before the current moment, which are among the n touch recognition points;

$$\sum_{k=1}^{n-1} A_k = 1,$$

and $A_1 > A_2 > \ldots > A_{n-1}$; $X_k$ represents an abscissa of the touch recognition point at the previous kth moment before the current moment, and $Y_k$ represents an ordinate of the touch recognition point at the previous kth moment before the current moment.

7. The touch compensation method according to claim 6, wherein $A_1$ is greater than 0.5.

8. The touch compensation method according to claim 7, wherein n is equal to 4, $A_1$ is equal to 0.6, $A_2$ is equal to 0.3, and $A_3$ is equal to 0.1.

9. The touch compensation method according to claim 1, wherein in a case where there are at least two lines, and there is an overlapping region between the second touch data of the touch models corresponding to the points to be compensated of two adjacent lines; and
compensating the second touch data according to the compensation data includes:
compensating a part of the second touch data that is located in the overlapping region according to the compensation data of any one of the points to be compensated of the two adjacent lines.

10. The touch compensation method according to claim 1, wherein the compensation data includes: central compensation data calculated based on touch data of a central point in the first touch data, and peripheral compensation data calculated based on touch data of peripheral points in the first touch data; and calculating the compensation data of the touch model corresponding to the point to be compensated according to the first touch data of the touch model corresponding to the touch recognition point of the previous 1st moment $T_1$ includes:
multiplying the touch data of the central point in the first touch data by a central compensation coefficient, a product obtained is used as the central compensation data; and
multiplying the touch data of the peripheral points in the first touch data by a peripheral compensation coefficient, a product obtained is used as the peripheral compensation data, wherein the central compensation coefficient is greater than or equal to the peripheral compensation coefficient.

11. The touch compensation method according to claim 10, wherein the central compensation coefficient is in a range of 0.2 to 0.8, and the peripheral compensation coefficient is in a range of 0.1 to 0.7.

12. The touch compensation method according to claim 11, wherein the central compensation coefficient is 0.32, and the peripheral compensation coefficient is 0.24.

13. The touch compensation method according to claim 10, wherein the second touch data includes: touch data of a central point and touch data of peripheral points; and
compensating the second touch data according to the compensation data includes:
adding the central compensation data to the touch data of the central point in the second touch data correspondingly; and
adding the peripheral compensation data to the touch data of the peripheral points in the second touch data correspondingly.

14. The touch compensation method according to claim 1, wherein after the second touch data is compensated according to the compensation data, and compensated touch data at the current moment is obtained, the touch compensation method further comprises:
replacing the second touch data that is uncompensated with compensated second touch data to obtain all compensated touch data at the current moment;

identifying a touch model of the current moment according to all compensated touch data at the current moment, and determining a touch recognition point of the current moment according to the identified touch model of the current moment.

15. The touch compensation method according to claim 14, wherein identifying the touch model of the current moment according to the all compensated touch data at the current moment, includes:

among the all compensated touch data at the current moment, if touch data of a touch point is greater than touch data of other touch points around the touch point, then identifying the touch point and the other touch points around the touch point as a touch model; and determining the touch recognition point of the current moment according to the identified touch model of the current moment, includes:

determining a central point of the touch model to be the touch recognition point of the current moment.

16. The touch compensation method according to claim 15, wherein the touch model is a nine-box matrix composed of 9 touch points.

17. A touch compensation apparatus, comprising: a processor and a memory, wherein the memory stores program instructions that are executable;

when the program instructions are executed by the processor, the touch compensation apparatus is caused to perform the following steps:

for at least one line, estimating coordinates of a point to be compensated at a current moment according to coordinates of n touch recognition points at n previous moments, the n previous moments before the current moment being $T_1$ to $T_n$, and n being an integer greater than or equal to 2;

calculating compensation data of a touch model corresponding to the point to be compensated according to first touch data of a touch model corresponding to a touch recognition point of a previous 1st moment $T_1$;

obtaining all touch data of a touch screen at the current moment;

obtaining second touch data at the current moment at a place where the touch model corresponding to the point to be compensated is located from the all touch data according to the coordinates of the point to be compensated; and compensating the second touch data according to the compensation data.

18. A non-transitory computer readable storage medium, wherein the non-transitory computer readable storage medium stores one or more program instructions, so as to perform one or more steps of the touch compensation method according to claim 1.

19. A touch screen, comprising the touch compensation apparatus according to claim 17.

* * * * *